Jan. 31, 1961 T. H. BONN 2,970,295

MEANS FOR ELIMINATING "SNEAK" CURRENTS IN CASCADED MAGNETIC AMPLIFIERS

Filed June 28, 1954

2 Sheets-Sheet 1

INVENTOR
THEODORE H. BONN

BY

ATTORNEY

Jan. 31, 1961 T. H. BONN 2,970,295

MEANS FOR ELIMINATING "SNEAK" CURRENTS IN CASCADED MAGNETIC AMPLIFIERS

Filed June 28, 1954 2 Sheets-Sheet 2

INVENTOR

THEODORE H. BONN

BY Ejerydight

ATTORNEY 2,970,295

MEANS FOR ELIMINATING "SNEAK" CURRENTS IN CASCADED MAGNETIC AMPLIFIERS

Theodore H. Bonn, Philadelphia, Pa., assignor, by mesne assignments, to Sperry Rand Corporation, a corporation of Delaware Filed June 28, 1954, Ser. No. 439,748

13 Claims. (Cl. 340—174)

This invention relates to means for eliminating "sneak" currents in cascaded magnetic amplifiers and more particularly to the elimination of "sneak" currents in connection with a shifting register employing magnetic amplifiers. One function of a shifting register in a computing circuit is desired on page 297 et seq. of the text book "High Speed Computing Devices" by the Staff of Engineering Research Associates, Inc., published by McGraw-Hill Book Company (1950).

An object of this invention is to eliminate the effect of "sneak" currents in connection with cascaded magnetic amplifiers.

Another object of this invention is to provide a means of elimination of the effects of "sneak" pulses which automatically compensates for the effects of changes in the amplitude of the power pulses supplied to the magnetic amplifiers.

A further object of this invention is to provide a shifting register composed of cascaded magnetic amplifiers in which the effect of "sneak" currents is neutralized.

Still an additional object of this invention is to provide a device for eliminating "sneak" pulses in cascaded magnetic amplifiers in which the means for neutralizing the effects of the "sneak" pulses provides automatic compensation for changes in the amplitude of the "sneak" pulses. This aids in preventing the means for eliminating the "sneak" pulses from itself affecting the operation of the apparatus in an undesired way.

A further object of the invention is to provide means for eliminating and compensating for "sneak" pulses, which is lower in cost than devices heretofore employed for that purpose.

A still further object of the invention is to increase the reliability of a system having magnetic amplifiers connected in cascade by the elimination of semiconductors (or other unilateral conducting means) heretofore employed.

The invention has still another object which is to improve the reliability of systems utilizing cascaded magnetic amplifiers. This is due in part to the fact that the means for compensating for the "sneak" pulses varies the magnitude of its compensating operation when the amplitude of the power pulses to the magnetic amplifiers varies.

A further object of the invention is to provide a system of cascaded magnetic amplifiers of smaller size than has heretofore been the practice.

The present invention is applicable to magnetic amplifiers of the general types described in the following two applications: Theodore H. Bonn and Robert D. Torrey, Serial No. 402,858, filed January 8, 1954, entitled "Signal Translating Device"; and John Presper Eckert, Jr., and Theodore H. Bonn, Serial No. 382,180, filed September 24, 1953, now Patent No. 2,892,998, entitled "Signal Translating Device." These applications are assigned to the same assignee as the present application.

While there will be described below an application of the present invention to a system of cascaded "complementing series" magnetic amplifiers, it is observed that the two foregoing applications not only describe "complementing series" amplifiers but other types as well. The present invention is not limited to systems having cascaded complementing type magnetic amplifiers, but may be applied to other systems as well. For example, the invention is applicable to cascaded arrangements broadly employing any one or more of the following four types of magnetic amplifiers: complementing series type, complementing parallel type, non-complementing series type and non-complementing parallel type. All four of these types are described in detail in the above-named prior applications.

In one form, the present invention employs a plurality of cascaded complementing magnetic amplifiers so interconnected as to form a shifting register. Since the output of each magnetic amplifier feeds the input coil of the next magnetic amplifier, a "sneak" current pulse will appear in the inputs of the cascaded magnetic amplifiers. The effect of these "sneak" currents is neutralized according to the present invention by applying magnetizing forces to the cores of the amplifiers, these magnetizing forces being of such magnitude as to compensate the magnetizing forces set up by the "sneak" pulses. Moreover, the compensating magnetizing forces and the ones due to the "sneak" currents are synchronized.

In one form of the invention, the compensating magnetizing forces are established by coils on the cores, fed by the same source of power pulses that supplies the "sneak" currents.

Figure 2:
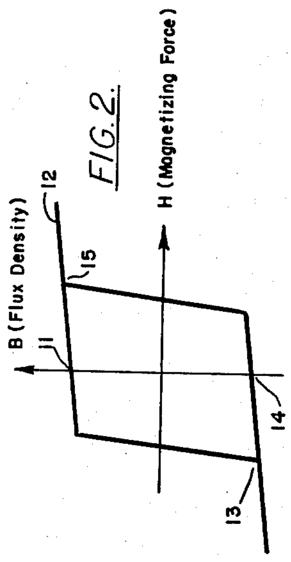
Figure 2 is a hysteresis loop of the material used for the cores of the magnetic amplifiers.
Figure 1:
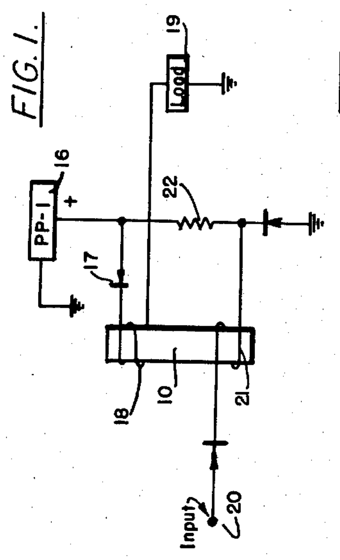
Figure 1 is a schematic diagram of a typical magnetic amplifier employed in connection with the invention.

Figure 1 is a schematic diagram of one type of magnetic amplifier that may be used in connection with the invention. The magnetic core 10 may be made of a variety of materials, among which are the various types of ferrites and the various magnetic tapes, including Orthonik and 4–79 Moly-Permalloy. These materials may have different heat treatments to give them different properties. The magnetic material employed in the core should preferably, though not necessarily, have a substantially rectangular hysteresis loop (as shown in Figure 2). Cores of this character are now well known in the art. In addition to the wide variety of materials available, the core may be constructed in a number of geometries including both closed and open paths; for example, cup-shaped, strips, and toroidal-shaped cores are possible. Those skilled in the art understand that when the core is operating on the horizontal (or substantially saturated) portions of the hysteresis loop, the core is generally similar in operation to an air core in that the coil on the core is of low impedance. On the other hand, when the core is operating on the vertical (or unsaturated) portions of the hysteresis loop, the impedance of the coils on the core will be high.

The source 16, of power pulses PP–1, generates a train of equally spaced square wave pulses. If it be assumed that at the beginning of any given pulse the core has residual magnetism and flux density as represented by point 11 of the hysteresis loop of Figure 2, the power pulse will drive the core from point 11 to saturation point 12. At the conclusion of the pulse the magnetization will return to point 11. Successive pulses from power source 16 will flow through rectifier 17, coil 18 and load 19, repeatedly driving the core from remanence point 11 to saturation point 12. During the interval in which the core is being driven from 11 to 12, the core is operating on a relatively saturated portion of the loop shown in Figure 2, whereby the impedance of coil 18 is low. Hence the power pulses will flow from source 16 to load 19 without substantial impedance. If, however, during the interval between two power pulses, a pulse is received at the input 20, it will pass through coil 21, resistor 22, source 16, to ground. This pulse will magnetize the core negatively driving it from point 11 to point 13. At the conclusion of this pulse the core will return to remanence point 14. The next power pulse from source 16 is just sufficient to drive the core from point 14 to point 15. Since this is a relatively unsaturated portion of the hysteresis loop, the coil 18 will have high impedance during this pulse and the current flow will be very low. At the conclusion of that pulse the magnetization will return to remanence point 11. If no signal appears on the input immediately following the last-named power pulse, the next power pulse will drive the core to saturation at point 12 and will give a large output at the load 19.

Consequently, it is clear that the magnetic amplifier of Figure 1 will feed large pulses to the load in response to each pulse from source 16, except that immediately after the receipt of any pulse on the input 20 the next power pulse will be blocked.

During the period that a power pulse is driving the core from point 14 to point 15, the core is unsaturated and therefore only a small current may flow through the power winding 18. This small current is known as a "sneak" current and it is the purpose of this invention to eliminate the effect of that current in cascaded magnetic amplifiers. While the invention is not limited to any particular form of cascaded amplifiers, I have elected to show the same in connection with the type of shifting register invented by John Presper Eckert, Jr. and covered in his application Serial No. 431,378, filed May 21, 1954, entitled "Shifting Register Employing Magnetic Amplifiers." That application is assigned to the same assignee as the present application. In order that one may understand the preferred form of shifting register to which my invention is applicable, I will now describe the shifting register of the aforesaid Eckert application. Thereafter I will point out in detail how I neutralize the effect of the "sneak" currents in his shifting register.

Figure 3:
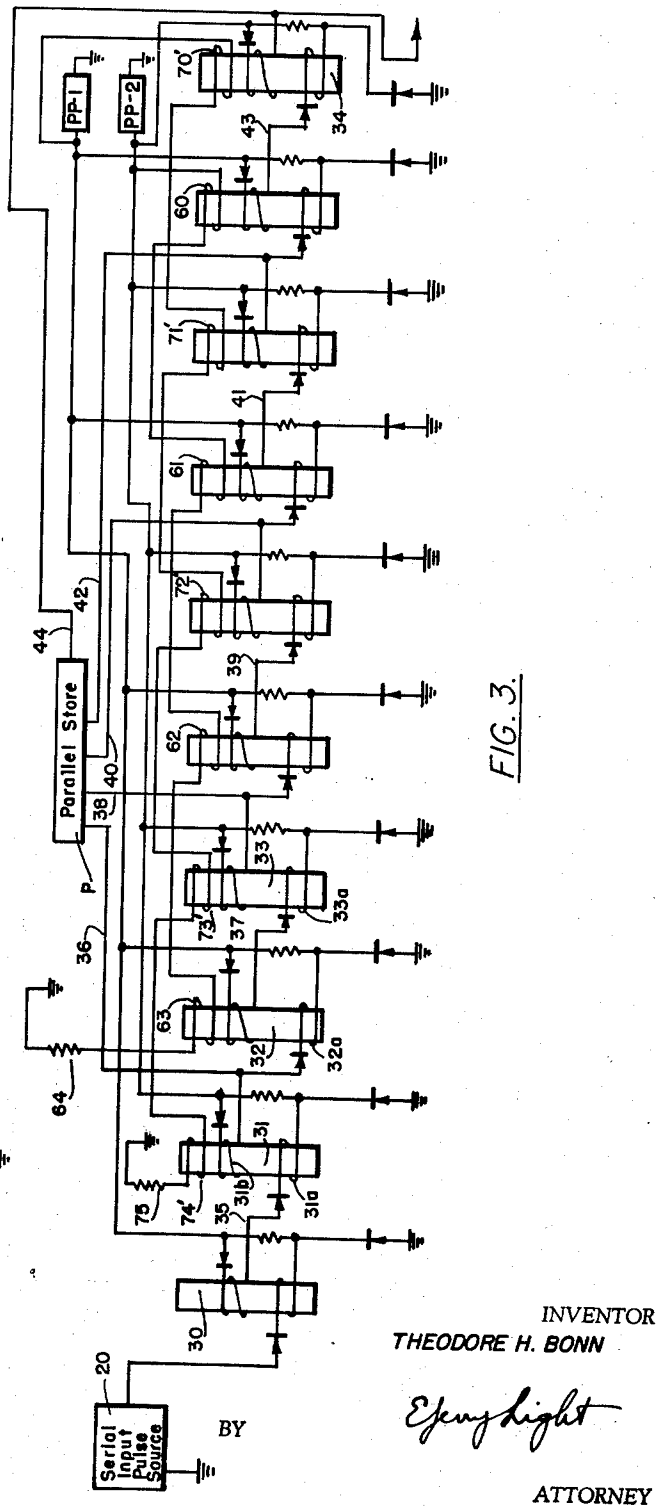
Figure 3 is a schematic diagram of a serial to parallel converter utilizing my improved means for neutralizing the "sneak" currents.
Figure 5:
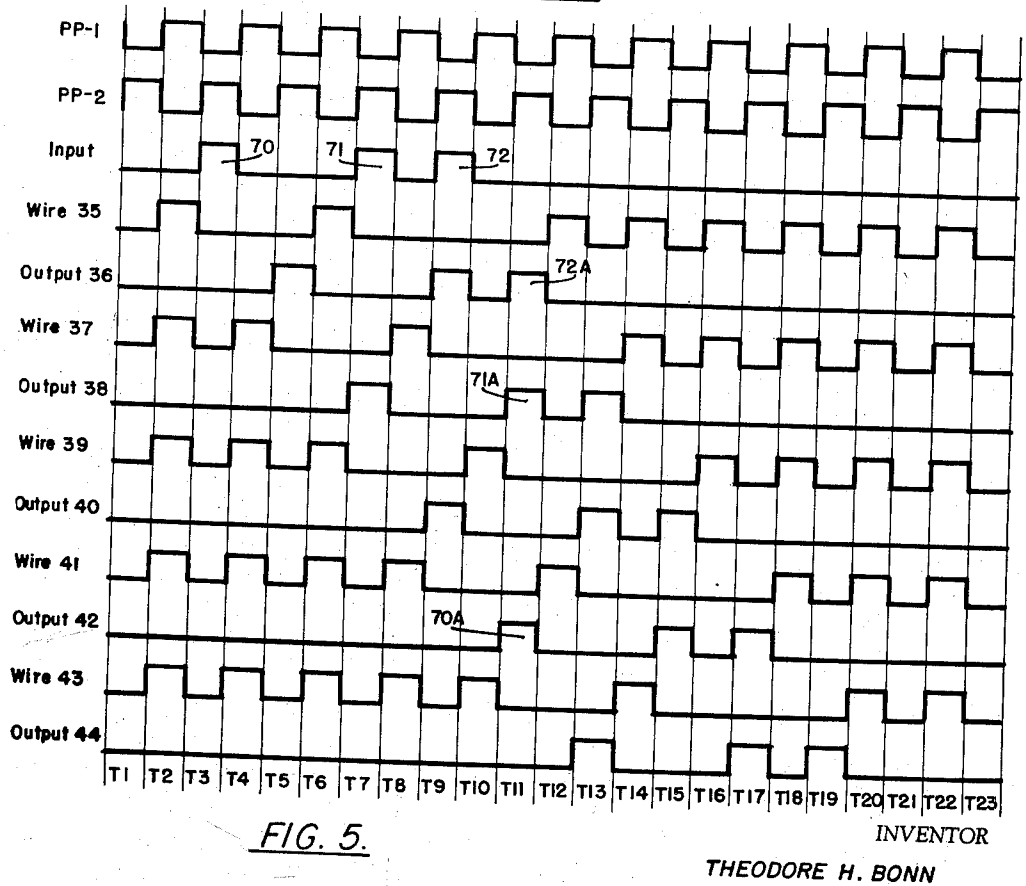
Figure 5 is a diagram illustrative of the wave forms and signals involved in the device of Figure 3.

Figure 3 illustrates a circuit employing the aforesaid amplifiers for the purpose of converting serial information into parallel information. The serial input 20 energizes the input pulse source of magnetic amplifier 30. The output of magnetic amplifier 30 energizes the input of magnetic amplifier 31. Similarly the output of magnetic amplifier 31 energizes the input of magnetic amplifier 32, etc. In other words, the magnetic amplifiers are connected in cascade. There are two sources of power pulses PP–1 and PP–2. The pulses from these sources may be equally spaced with the pulses of one source occurring during the intervals between the pulses of the other source, as shown in Figure 5. The power pulses from the first source PP–1 energize the alternate magnetic amplifiers and the pulses from the second source PP–2 energize the remaining magnetic amplifiers. The outputs 36, 38, etc., of the odd numbered magnetic amplifiers feed the parallel element P which may be a magnetic or electrostatic storage device.

The functioning of the device of Figure 3 can be best understood in connection with the wave forms of Figure 5. The wave forms of the two sources of power pulses are illustrated at the top of this figure, below which appears the serial signal on the input 20. For purposes of illustration it is assumed that there are three pulses 70, 71 and 72 appearing on the input at time periods T3, T7 and T9. It follows that the wave form on wire 35 will be as shown in Figure 5. Since there is no pulse on the input at time period T1, the next power pulse PP–1 will pass through amplifier 30 and create a pulse on wire 35 at time period T2. Since there is a pulse 70 on the input at time period T3, the amplifier 30 will be blocked during period T4 and no pulse will appear on wire 35 during that time period. Since there is no input signal at time period T5, the next power pulse will pass through amplifier 30 at time period T6 and will appear on wire 35 at that time. In view of pulses 71 and 72 appearing on the input at time periods T7 and T9, power pulses will be blocked by amplifier 30 during time periods T8 and T10. Hence the next pulse on wire 35 will be at time period T12. There will be pulses in output 36 conforming to each one of power pulses PP–2, except at time intervals immediately following pulses on wire 35. Hence there is no pulse at output 36 at time T1, none at time T3, one at T5, none at T7, and power pulses at T9 and T11.

There will be pulses on wire 37 coming from source PP–1, except during those intervals immediately following pulses on output 36. Hence the wave form shown in Figure 5, for wire 37, results. At output 38 there will be pulses conforming to those of source PP–2 at all times except those intervals immediately following pulses on wire 37. Hence the wave form shown for output 38 results (see Figure 5). Pulses will appear on wires 39, 41 and 43 conforming to power pulses from the source PP–1, except where a pulse appeared in the output of an immediately preceding amplifier at a time interval immediately preceding any given pulse in question. As a result, the wave forms shown in Figure 5 for wires 39, 41 and 43 result. It is also true that source PP–2 will produce pulses at outputs 40, 42 and 44, except during those intervals immediately following a pulse on the preceding wire (39, 41 or 43 respectively) at an immediately preceding time interval.

Since there was no input pulse at serial input 20, at time period T1, there was no pulse on output 44 at time period T11. In view of input pulse 70 at time period T3, there was an output pulse 70A at output 42. Since there was no input pulse on serial input 20, at time period T5, there was no output pulse on output 40 at time period T11. In view of input pulse 71 at time period T7, there was pulse 71A at output 38. Likewise input pulse 72 created output pulse 72A at output 36. It follows that there is a parallel output at time period T11 conforming to the serial signal on the input 20. Since the output wires 36, 38, 40, 42 and 44 are fed to the parallel store P, if the latter is arranged to record or store the pulses fed thereto at time period T11, it will record these pulses as parallel information.

Figure 4:
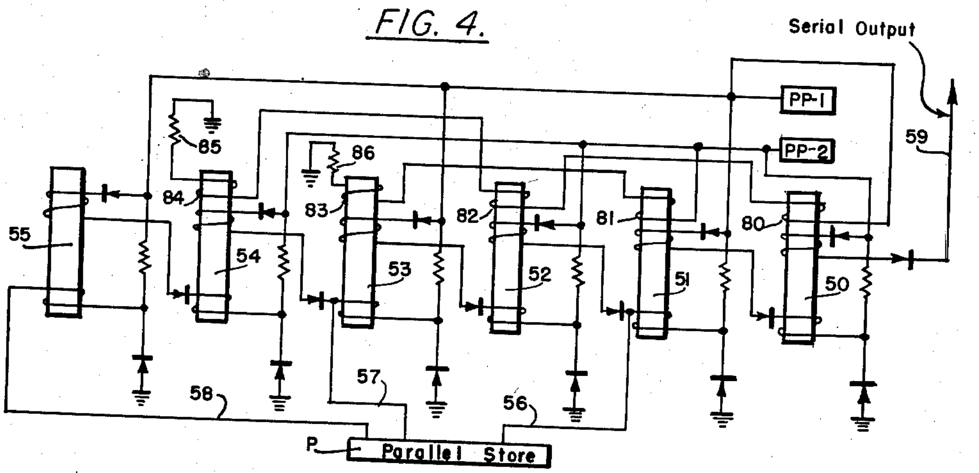
Figure 4 is a schematic diagram showing the connections employed when the device is used as a parallel to serial converter along with my improved means for neutralizing the "sneak" currents.

Figure 4 is a schematic diagram of a shifting register for converting information on the parallel store P to the serial output 59. Only a three-stage register, suitable for only three digits is shown, but additional stages for additional digits could be added according to the same principles. When it is desired to impress the parallel information in P upon the shifting register to thus get a serial output, necessary switches or gates in wires 56, 57 and 58 are closed during a positive pulse from source PP–2, so that the aforesaid wires are respectively connected to the inputs of magnetic amplifiers 51, 53 and 55. Any pulse then present on wire 56 will be applied to the input of amplifier 51 during the period of one of the positive pulses PP–2 and will create an output pulse on wire 59 during the next positive power pulse PP–2.

Any pulse on wire 57 from the parallel store will be applied to the input of magnetic amplifier 53 during the occurrence of a positive pulse PP–2 and will produce an output pulse on wire 59 coincidental with the second pulse PP–2 occurring thereafter.

Any pulse appearing on wire 58 will be applied to the input of magnetic amplifier 55 during the period of a power pulse PP–2 and will create an output pulse on wire 59 during the period of the third power pulse PP–2 thereafter.

It follows that if pulses are applied simultaneously to wires 56, 57 and 58 during the period of one of the power pulses PP–2, there will be pulses in the output 59 at the intervals spaced by one, two and three power pulses (PP–2), after the application of the parallel signals to said wires.

One skilled in the art can see from reading the foregoing description and studying the circuit of Figure 4 that the system will act as a shifting register and will convert parallel information into serial information.

Having thus described the shifting register, which taken per se forms no part of my invention, I will now explain my improvement thereon. With reference to Figure 3, it is noted that during the time when a power pulse from source PP–1 energizes the power winding on core 30, during the interval when that core is not saturated, there will be a "sneak" current flowing through the control winding 31*a* and thereby magnetizing core 31 to a small extent. There may be similar "sneak" currents in all the control windings 31*a*, 33*a*, etc. of the odd numbered cores 31, 33, etc. of the system. The magnetizing forces due to these "sneak" currents are neutralized by incorporating coils 70′, 71′, 72′, 73′ and 74′ on the odd numbered cores 31, 33, etc. These coils are fed by pulses from power source PP–1 through resistor 75 so that a current flows through the coils in such direction as to set up magnetizing forces that neutralize those due to the "sneak" currents.

There will also be "sneak" currents in the control windings (for example 32*a*) of the even-numbered amplifiers. A "sneak" current in coil 32*a* appears whenever one of the power pulses from source PP–2 flows through the power winding 31*b* during a period when the core 31 is not saturated. The effect of this "sneak" current is neutralized by coil 63 on core 32. This coil is fed by a small current from source PP–2 through resistor 64. The current through coil 63 is just sufficient to set up a magnetizing force equal and opposite to that caused by the flow of the "sneak" current in coil 32*a*. Coils 60, 61 and 62 are in series with coil 63 and perform similar functions upon their respective cores.

It is apparent that by proper selection of the resistances of resistors 64 and 75 that the current flowing in the compensating coils 60 to 63 inclusive, and 70′ to 74′ inclusive, may just neutralize the effects of the "sneak" currents. The compensating effects vary whenever the magnitudes of the power pulses vary.

It is also noted that one of the semiconductors heretofore employed in connection with each individual amplifier is not required with the present invention. Therefore, the apparatus may be built in smaller space than prior devices.

The present arrangement is also lower in cost than the arrangement heretofore developed.

In the parallel to serial shifting register of Figure 4, the even numbered magnetic amplifiers 50, 52 and 54 have thereon coils 80, 82 and 84 which are fed from power source PP–1 and which neutralize the "sneak" currents created by the odd numbered magnetic amplifiers 51, 53 and 55. Likewise, magnetic amplifiers 51 and 53 have coils 81 and 83, fed by the power source PP–2 and which neutralize the "sneak" currents created by the amplifiers 52 and 54. Resistors 85 and 86 control the magnitude of the compensating currents so that they just offset the effect of the "sneak" currents.

I claim to have invented:

1. A shifting register comprising a plurality of magnetic amplifiers connected in cascade, each amplifier having a core capable of assuming stable remanence conditions, a power winding and a control winding on each of said cores, the power winding of one amplifier being electrically connected to the control winding of the next amplifier, a first source for supplying a first series of spaced power pulses to the power windings of said amplifiers in odd-number positions thereby to apply first pulse-type magnetomotive forces to said odd amplifiers, a second source fcr spraying a second series of spaced power pulses to the power windings of said amplifiers in even-numbered positions, said second source supplying its pulses during the spaces between pulses of the first series of pulses thereby to apply second pulse-type magnetomotive forces to said even amplifiers in out-of-phase relation to said first pulse-type magnetomotive forces, winding means for applying additional pulse-type magnetizing forces to the even amplifier cores which additional pulse-type magnetizing forces are synchronized with the power pulses of the first source and which are out of phase with said second magnetomotive forces applied to said even cores thereby to neutralize the magnetizing forces in the even cores due to the "sneak" currents arriving from the power windings of the odd-numbered magnetic amplifiers during the application of said first magnetomotive forces to said odd numbered amplifiers, and winding means for applying additional magnetizing forces to odd amplifier cores which additional pulse-type magnetizing forces are synchronized with the power pulses of the second source and which are out of phase with said first magnetomotive forces applied to said odd cores thereby to neutralize the magnetizing forces in the odd cores applied by the "sneak" currents arriving from the power windings of the even amplifiers during the application of said second magnetomotive forces to said even numbered amplifiers.

2. A shifting register as defined in claim 1 including means for feeding serial signals into the control winding on the first core and taking parallel signals from the outputs of even numbered amplifiers.

3. A shifting register as defined in claim 1 including means for feeding parallel signals into the inputs of odd-numbered amplifiers and taking serial signals from the output of the last amplifier.

4. In combination, a first plurality of magnetic amplifiers, a second plurality of magnetic amplifiers, each amplifier in both said pluralities comprising a core of magnetic material capable of assuming stable remanence conditions and having power winding means, control winding means, and winding means thereon for suppressing sneak pulses, means coupling the power winding means of each amplifier in each of said pluralities to the control winding means of another amplifier in the other of said pluralities, a first source of regularly spaced pulses, a second source of regularly spaced pulses out of phase with the pulses of said first source, means coupling said first source to the power winding means of said first plurality of amplifiers and to the sneak pulse suppressor winding means of said second plurality of amplifiers, and means coupling said second out-of-phase source to the power winding means of said second plurality of amplifiers and to the sneak suppressor winding means of said first plurality of amplifiers so that each of said amplifiers in both said pluralities has pulses periodically applied to each of said power and sneak-pulse-suppressor winding means so that simultaneously occurring magnetomotive forces of equal magnitude and opposite plurality are produced by pulses in its sneak suppressor winding means and in its control winding means respectively such that equal and opposite magnetomotive forces tend to nullify each other.

5. The combination of claim 4 wherein the power winding means of said first and second pluralities of amplifiers are coupled in parallel to said first and second sources respectively, said sneak pulse suppressor winding means of said first and second pluralities of amplifiers being connected in series to said second and first sources respectively.

6. The combination of claim 4 wherein the power winding means, control winding means, and sneak pulse suppressor winding means of each of said amplifiers comprise three distinct windings carried by the core of said amplifier.

7. In a computing system, a shifting register comprising a plurality of magnetic amplifiers, said magnetic amplifiers including a core capable of assuming either of two stable states, said amplifiers being connected in cascade and arranged so that a pulse fed to the first one causes the amplifiers to successively change from one to the other of their stable states, á parallel type of component of a computing system for supplying input signals to the odd numbered ones of said cascaded amplifiers, circuits respectively connected to said parallel type of component and also respectively connected to alternately spaced ones of said amplifiers, each magnetic amplifier including a core of magnetic material capable of assuming stable remanence conditions and having power and control windings thereon, first means for producing a first train of spaced pulses, means for passing said first train of spaced pulses through the power windings on each odd numbered core to the control winding of the next even numbered core in the absence of an input signal to said odd numbered amplifiers, second means for producing a second train of spaced pulses, means for passing said second train of spaced pulses through the power winding of each even numbered core to the control winding of the next odd numbered core in the absence of a pulse having passed through said power winding on said odd numbered cores, the pulses of each train occurring during the spaces between the pulses of the other whereby said first and second pulse trains are out of phase with one another, means for overcoming any sneak pulses arriving at the control windings on the even numbered cores from the preceding odd numbered cores including suppressor coils on the even numbered cores, said coils being fed by pulses supplied by said first means for producing pulses whereby the pulses supplied to said suppressor coils are in synchronism with those fed to the power windings of the odd numbered cores, first current controlling means coupled to said suppressor coils so that current in said suppressor coil may be regulated to a predetermined value, means for overcoming any sneak pulses arriving at the odd numbered cores from the preceding even numbered cores including suppressor coils on the odd numbered cores, said coils being fed by still further pulses supplied by said second means for producing pulses in synchronism with those fed to the power windings of the even numbered cores, and second current controlling means coupled to said suppressor coils so that current in said suppressor coil may be regulated to a predetermined value.

8. In a shifting register; a plurality of groups of magnetic amplifiers with a predetermined number of such amplifiers in each group; the output of each group feeding the input of the next; the amplifiers within any group being connected in cascade so that the output of one amplifier feeds the input of the next amplifier; each magnetic amplifier including a code of magnetic material capable of assuming stable remanence conditions and having power and control windings thereon; means for selectively passing a train of regularly spaced pulses directly through the power winding of each core to the control winding of the next core, with the pulses fed to each amplifier of the group being successively displaced in time; and means for cancelling the effect of sneak currents arriving at one of the magnetic amplifiers when the power winding at the immediately preceding amplifier is being fed by said spaced pulses, said cancelling means including a suppressor coil on the core of the amplifier, said suppressor coil being fed by regularly spaced pulses in phase with the pulses fed to the power winding of the immediately preceding amplifier and out of phase with the pulses fed to the power windings of the same amplifier.

9. In combination, a first core capable of assuming stable remanence conditions and having two windings thereon, a first source of spaced regularly occurring power pulses in series with the first of said windings for supplying pulses to said winding whereby said first core is regularly subjected to first magnetomotive forces, control means for selectively energizing the other winding during the spaces between said power pulses from said first source to thereby determine whether said first core is in a saturated or unsaturated state when said first magnetomotive forces are applied, a second core capable of assuming stable remanence conditions, coil means linked to said second core, said coil means being connected to said first winding on said first core and operative to apply a magnetomotive force to the second core in accordance with said power pulses passing through said first winding, a second source of spaced regularly occurring power pulses for supplying power pulses having a phase opposite to the phase of the pulses supplied by said first source, winding means connected to said second source for regularly applying to said second core second magnetomotive forces opposite in phase to said first magnetomotive forces, coil means for applying to said second core further magnetomotive forces synchronized with but having a polarity opposite to the polarity of the magnetomotive forces applied to said second core by said first coil means thereby to cancel the magnetomotive forces in said second core which are due to the power pulses of said first source when the latter pass through the first winding while the first core is unsaturated, and output means controlled by the resultant of the magnetomotive forces in the second core.

10. In combination, a first magnetic amplifier including a first core capable of assuming stable remanence conditions and having two windings thereon, a first source for supplying spaced power pulses connected in series with a first one of said windings, control means for selectively energizing the other one of said windings during the spaces between pulses from said first source to thereby determine whether or not the power pulses from said first source cause said first core to saturate, a second magnetic amplifier including a second core capable of assuming stable remanence conditions, a control winding on the second core connected in series with said first winding thereby to receive the power pulses from said first source, a power winding on said second core, a second source for supplying spaced power pulses to said power winding, said second source producing power pulses of opposite phase to said pulses from said first source whereby pulses from said second source occur during the spaces between the pulses from said first source, and means including a winding for applying additional magnetizing forces to said second core, said additional magnetizing forces being synchronized with the power pulses of said first source and out of phase with the pulses applied to said power winding on said second core by said second source, said last named means including means to limit the magnitude of said additional magnetizing forces to a predetermined value in order to neutralize the magnetizing forces in the second core due to the flow of sneak currents from said first source through said first winding of said first core to said control winding of said second core when said first source is applying a signal to said first winding.

11. In combination a first magnetic amplifier including a core capable of assuming stable remanence conditions and having power and control windings thereon, a first source of spaced power pulses for passing current through said power winding, control means for selectively energizing the control winding during the spaces between pulses of said source to determine whether the core is saturated or unsaturated when the power pulses are supplied, a second magnetic amplifier including a core capable of assuming stable remanence conditions and having power and control windings thereon, a second source of spaced power pulses for passing current through the second power winding, said second source supplying its pulses during the spaces between the pulses of said first source whereby said first and second amplifiers are energized out of phase with one another, means connecting the control winding of said second amplifier to receive the pulses from the first source that pass through the first power winding, a third magnetic amplifier including a core capable of assuming stable remanence conditions and having power and control windings thereon, the power winding of the third magnetic amplifier being connected to receive pulses from the first source of spaced pulses whereby said first and third amplifiers are energized in phase with one another, means connecting the control winding of the third magnetic amplifier to receive the pulses from the second source that pass through the second-named power winding, means including a coil on the second core for creating spaced pulse-type magnetizing forces in the second core out of phase with the power pulses of said second source thereby to neutralize the spurious magnetizing forces in said second core due to power pulses flowing through the power winding of said first core to the control winding of said second core while the first core is unsaturated, and means including a coil on the third core for creating additional spaced pulse-type magnetizing forces in the third core out of phase with the power pulses of said first source thereby to neutralize the spurious magnetizing forces in said third core due to power pulses flowing through the power winding of the second core to the control winding of the third core while the second core is unsaturated.

12. A shifting register comprising first and second power source means for respectively producing first and second groups of spaced out of phase pulses with the pulses of the second group occurring in the spaces between the pulses of the first group, a plurality of magnetic amplifiers connected in a cascade relation with the output of each amplifier feeding the input of the next amplifier, each amplifier including a magnetic core capable of assuming stable remanence conditions having a power winding and a control winding thereon, the power windings of the odd numbered amplifiers being fed by said first power source and the power windings of said even numbered amplifiers being fed by said second power source and delivering or not delivering the pulses to the output of the amplifier according to the impedance of the power winding which is determined by the relative saturation state of the magnetic core, and means for cancelling the effect of any sneak currents that arrive at the even numbered amplifiers from the preceding odd numbered amplifiers when said odd numbered amplifiers are being set by a signal applied to said power winding, said even numbered cancelling means including first suppressor coils respectively on the cores of the even numbered amplifiers, said first coils being fed by said first power source via current regulating means, and means for cancelling the effect of any sneak currents that arrive at the odd numbered amplifiers from the preceding even numbered amplifiers when said even numbered amplifiers are being set by a signal applied to said power winding, said means including second suppressor coils respectively on the cores of the odd numbered amplifiers, said second coils being fed by said second power source via current regulating means.

13. In a shifting register, a plurality of magnetic amplifiers connected in cascade, each of said amplifiers including a magnetic core exhibiting a hysteresis characteristic having two stable states, first means coupled to a first winding on the core of alternate ones of said amplifiers for setting the core to one of said stable states, second means coupled to a first winding on the cores of the intermediate ones of said amplifier for setting the core to one of said stable states, separate means coupled to a second winding on the core of each of said amplifiers for resetting the core to the other of said stable states, and sneak pulse suppressor means coupled to each of said amplifiers, said suppressor means including a third winding on the core of each of said amplifiers, said third winding coupled via current regulator means to one of said first and second means coupled to said first windings so that said first winding and said third winding on each core are coupled to different ones of said first and second means and said first winding on one core and said third winding on the next succeeding cascaded core are coupled to the same one of said first and second means.

References Cited in the file of this patent

UNITED STATES PATENTS

| | | |
|---|---|---|
| 2,654,080 | Browne | Sept. 29, 1953 |
| 2,708,722 | Wang | May 17, 1955 |
| 2,768,312 | Goodale | Oct. 23, 1956 |
| 2,825,890 | Ridler et al. | Mar. 4, 1958 |
| 2,886,799 | Crooks | May 12, 1959 |

OTHER REFERENCES

Journal of App. Physics, January 1950, pp. 49–54.

"Static Magnetic Memory for Low Cost Computer" (Kincaid), Electronics, January 1951, pp. 108–111. (Fig. 8, p. 111 relied on.)

Paper No. 150 of Winter Meeting of IRE, Mar. 5, 1952, Fig. 8.

"Static Magnetic Memory, Its Application to Computers and Controlling Systems" (Wang), Procedure of Association of Computing Machinery, May 2 and 3, 1952, pp. 207–212, Fig. 6b relied on.

UNITED STATES PATENT OFFICE
CERTIFICATE OF CORRECTION

Patent No. 2,970,295 January 31, 1961

Theodore H. Bonn

It is hereby certified that error appears in the above numbered patent requiring correction and that the said Letters Patent should read as corrected below.

Column 1, line 20, for "desired" read -- described --; column 6, line 8, for "spraying" read -- supplying --; column 7, line 63, for "code" read -- core --.

Signed and sealed this 21st day of November 1961.

(SEAL)
Attest:

ERNEST W. SWIDER
Attesting Officer

DAVID L. LADD
Commissioner of Patents

USCOMM-DC